United States Patent
Bingham

[15] 3,667,522
[45] June 6, 1972

[54] SLICING APPARATUS

[72] Inventor: David W. Bingham, Brighton, Victoria, Australia

[73] Assignee: Pitters Proprietary Limited, Moorabbin, Victoria, Australia

[22] Filed: Jan. 28, 1970

[21] Appl. No.: 6,525

[30] Foreign Application Priority Data

Feb. 12, 1969   Australia .............................. 50353/69

[52] U.S. Cl. .............................. 146/131, 146/151, 83/391, 83/647.5
[51] Int. Cl. ........................................ B26d 4/22, B26d 5/14
[58] Field of Search .................. 146/151, 131, 137, 138, 155; 83/391, 643, 646, 647.5

[56] References Cited

UNITED STATES PATENTS

| | | |
|---|---|---|
| 3,411,460 | 11/1968 | Weil.................................... 146/151 X |
| 2,076,959 | 4/1937 | McKee et al........................... 146/155 |
| 2,551,876 | 5/1951 | Cronin.................................... 83/647.5 |
| 2,889,878 | 6/1959 | White et al.......................... 146/151 X |

Primary Examiner—Willie G. Abercrombie
Attorney—Barnes, Kisselle, Raisch & Choate

[57] ABSTRACT

Cutting or slicing apparatus having a cutter blade movably mounted on a frame so as to be oscillatable along an arcuate path of travel, and gauge means adapted to correctly locate material to be cut by the cutter blade and which is also movably mounted on the aforementioned frame. The gauge means is positioned in advance of the cutting edge of the blade to allow passage of cut material to a conveyor located therebeneath, and it is coupled with the cutter blade so as to reciprocate in response to oscillatory movement of that blade. The coupling is such that a constant spacing is maintained between the cutting edge of the blade and the adjacent side of the gauge means.

11 Claims, 7 Drawing Figures

SLICING APPARATUS

This invention relates to cutting or slicing apparatus, and is particularly although not exclusively concerned with such apparatus for cutting or slicing foodstuffs. Apparatus according to the invention is especially applicable to cutting blocks or sections of frozen fish meat or pulp to form what are commonly called fish "fingers." It will be therefore convenient to describe the invention in relation to the manufacture of such fish "fingers."

Fish "fingers" are generally elongated rectangular sections cut from blocks of frozen fish meat or pulp. The cut sections are usually coated with a batter and bread crumbs and subsequently cooked preparatory to packaging.

A major problem encountered in producing such fish sections is obtaining accurate and clean cutting so that the sections are uniform size and there is a minimum waste of material. Each section must be gauged before cutting to obtain the correct size, and it is generally necessary for the gauge to move with the cutter. Hitherto, it has been common to use cutting apparatus having a reciprocatable cutter blade because it is relatively simple to couple the gauge to such a blade for simultaneous movement, but the cutting action achieved is generally unsatisfactory.

It is a principal object of the present invention to provide cutting or slicing apparatus which is of relatively simple economic construction and which has a clean cutting action. It is a further object of a preferred embodiment of the invention to provide such apparatus which enables accurate slicing of foodstuffs such as frozen fish meat or pulp.

According to the present invention, there is provided cutting or slicing apparatus including; a main frame; a cutter blade movably mounted on said frame and operatively connected to drive means so as to be reciprocatable along a path of travel; and gauge means movably mounted on said frame for correctly locating material to be cut by said cutter blade, and being located in advance of the cutting edge of the blade to allow passage of cut material therebetween; said gauge means being coupled to the cutter blade so as to reciprocate in response to said reciprocatory movement of the blade, the direction of movement of the gauge means being oblique to said path of travel, and the coupling is such as to maintain a predetermined spacing between said cutting edge and the adjacent side of said gauge means.

The following description refers in more detail to these essential features and further optional features of the invention. To facilitate an understanding of the invention, reference is made to the accompanying drawings where these features are illustrated in preferred form. It is to be understood however, that the essential and optional features of the invention are not limited to the specific forms of these features as shown in the drawings.

Figure 1:
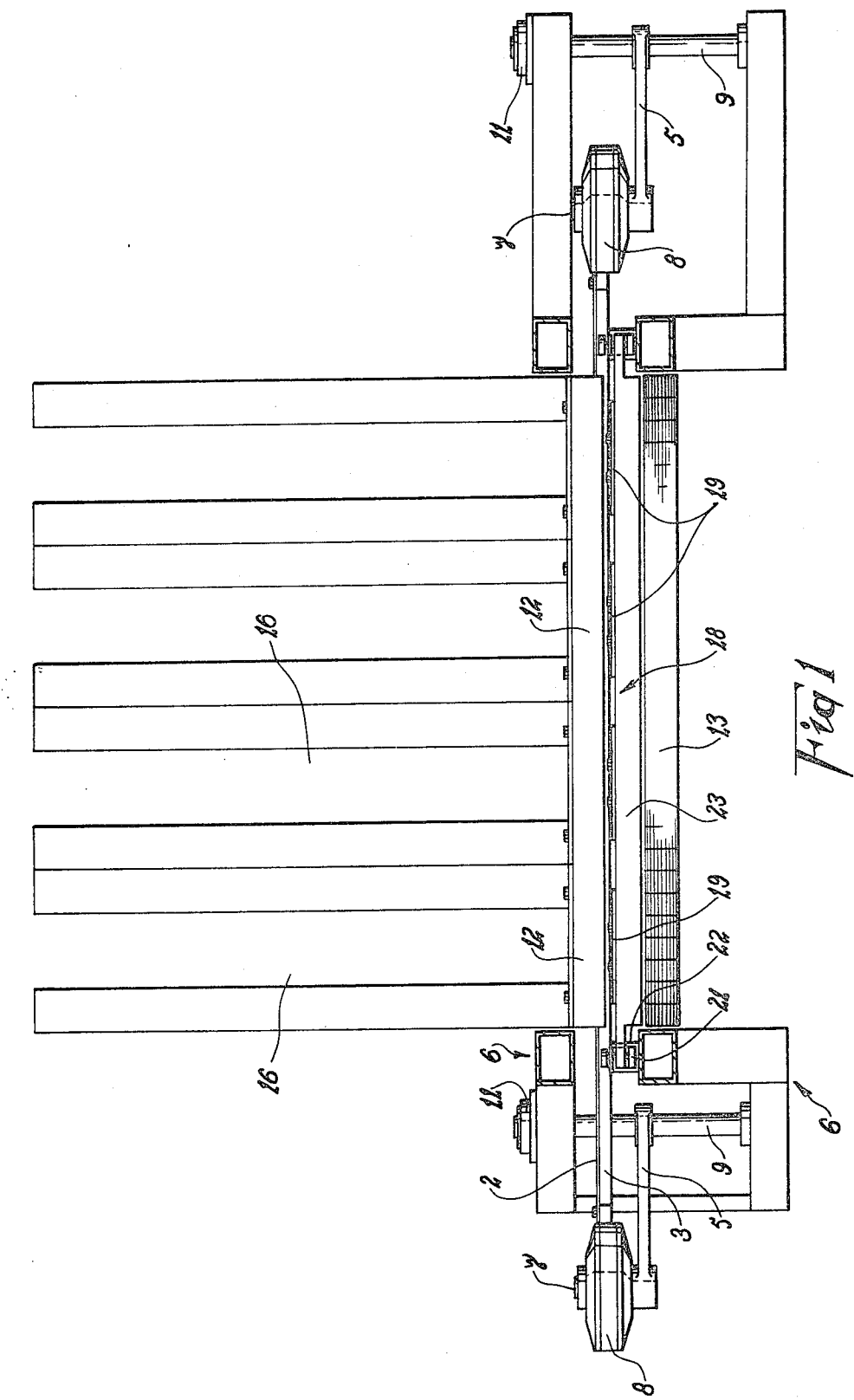
FIG. 1 is a semi-diagrammatic front elevational view of one embodiment of the invention.

The cutter preferably includes an elongated blade 2 removably secured to a carrier bar 3 so that the cutting edge 4 of the blade 2 protrudes beyond one longitudinal edge of the carrier bar 3. The blade mounting may include a pair of control arms 5, each of which has its opposite end portions respectively pivotally connected to respective end portions of the carrier bar 3 and a rigid support such as a machine frame 6. The two control arms 5 are preferably of substantially equal length.

In one form, the cutter pivot 7 of each control arm 5 includes a relatively heavy duty bearing 8 having a large bearing surface so as to minimize relative movement, other than the desired pivotal movement, between the carrier bar 3 and the respective control arm 5. Each machine frame pivot may include a rotatable shaft 9 which is secured to its respective control arm 5 against movement relative thereto. At least one of the shafts 9 is drivably connected to appropriate drive means (not shown) for oscillatory movement within a bearing 11 secured to the machine frame 6. Both pivots of each control arm 5 preferably have their respective axes extending substantially normal to the plane of movement of the cutting edge 4.

Figure 3:
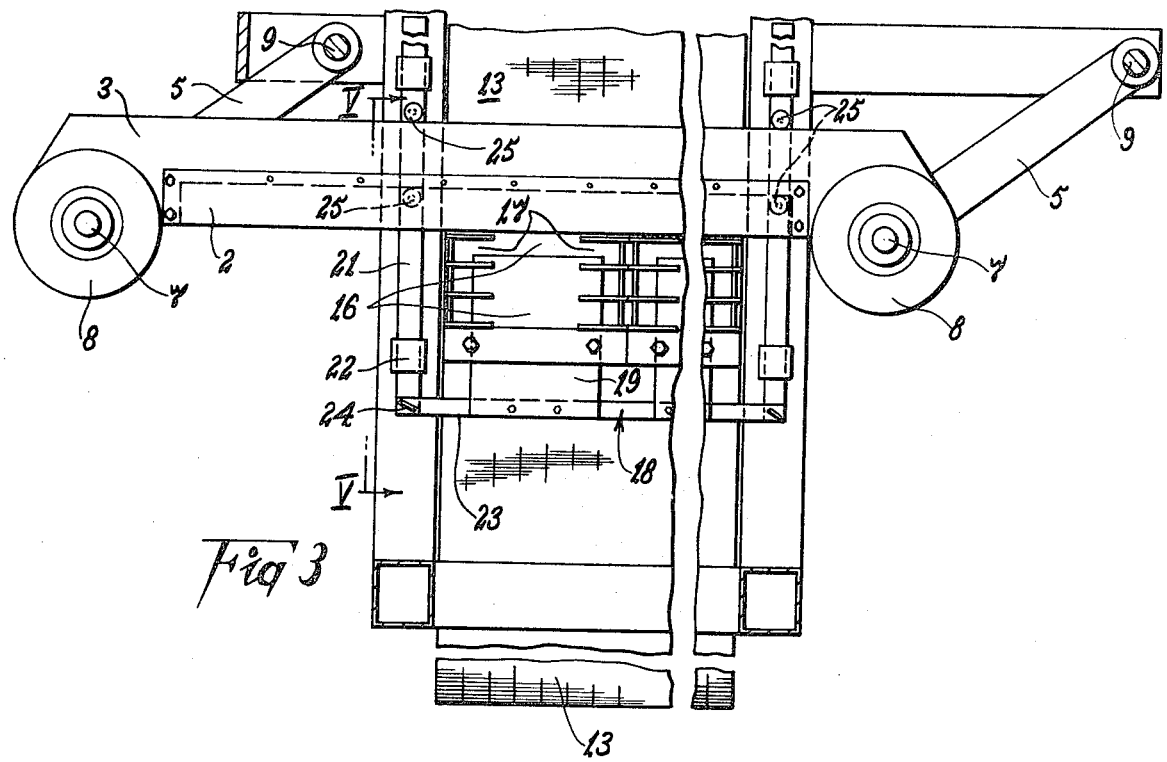
FIG. 3 is an enlarged plan view of the cutter assembly of the apparatus shown in FIG. 1, but showing the cutter blade in its retracted position.
Figure 4:
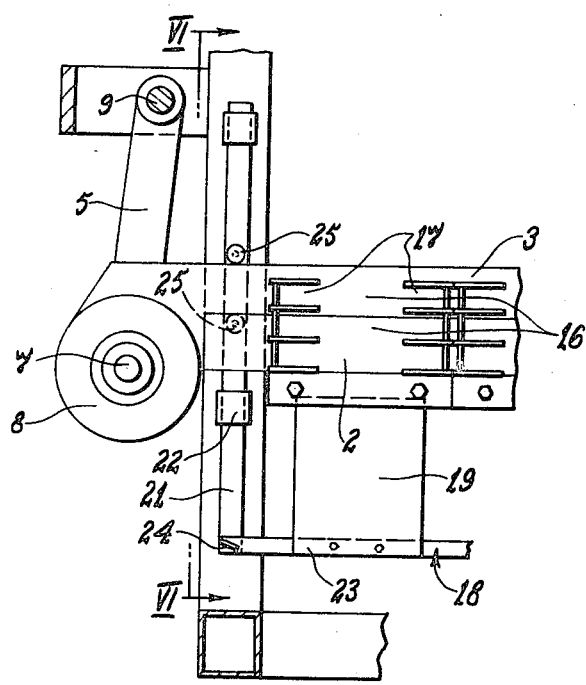
FIG. 4 is a view similar to FIG. 3 but showing the cutter blade in its extended position.
Figure 5:
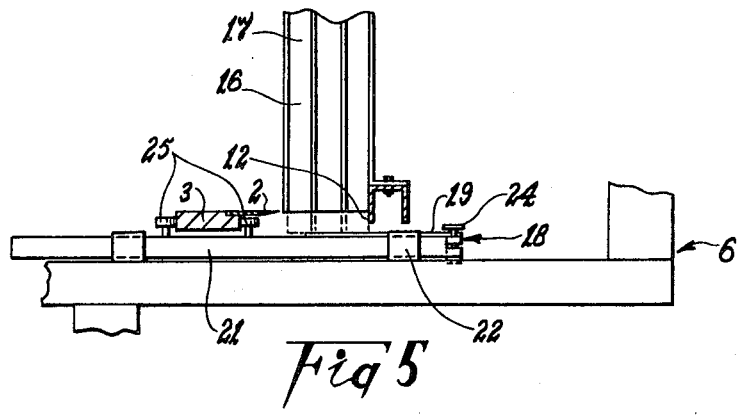
FIG. 5 is a cross-sectional view taken along line V—V of FIG. 3.
Figure 6:
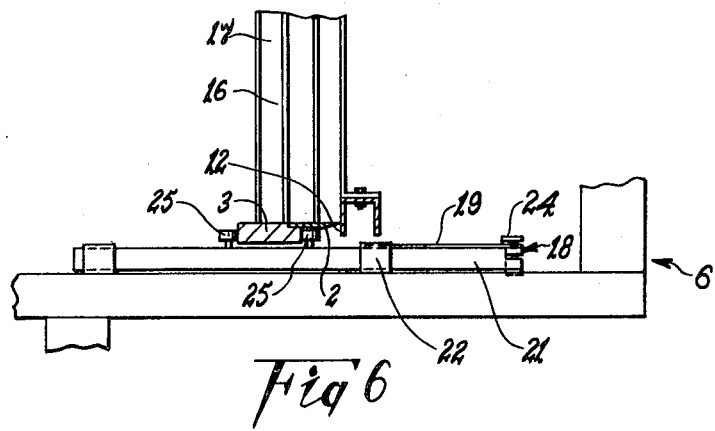
FIG. 6 is a cross-sectional view taken along line V1—V1 of FIG. 4.

The cutter blade mounting is such that the blade 2 is movable between a retracted position (FIGS. 3 and 5) in which it is held clear of the material to be cut, and an extended position (FIGS. 4 and 6) in which it has passed substantially completely through that material. A suitable backing plate 12 (FIGS. 1 and 5) may be located to restrain the material as it is being cut, and that backing plate 12 preferably extends beneath the cutting edge 4 of the blade 2 as shown in FIG. 5, to provide maximum surface contact with a section of material being cut. In moving from the retracted position to the extended position, the blade 2 moves both towards and in the lengthwise direction of the backing plate 12. This movement is caused by the control arms 5, and results in a particularly effective cutting action.

Because of the influence of arms 5, the blade 2 travels through an arcuate path during operation, and the arrangement is preferably such that the cutting edge 4 extends substantially tangential to the arc defining that path of travel when the blade 2 is in its extended position. Obviously, the same or similar — i.e., straight line movement oblique to the backing plate 12 — can be achieved through means other than the arms 5. For example, movement of the blade 2 may be controlled through cam means.

Preferably, the cutter blade 2 is located above and extends transversely across a suitable conveyor 13 carried by the machine frame 6. Thus, sections of material 14 (see FIG. 7) cut from a main body 15 by the blade 2 may drop on to the conveyor 13 for transport to an appropriate processing station or storage, as required.

Figure 2:
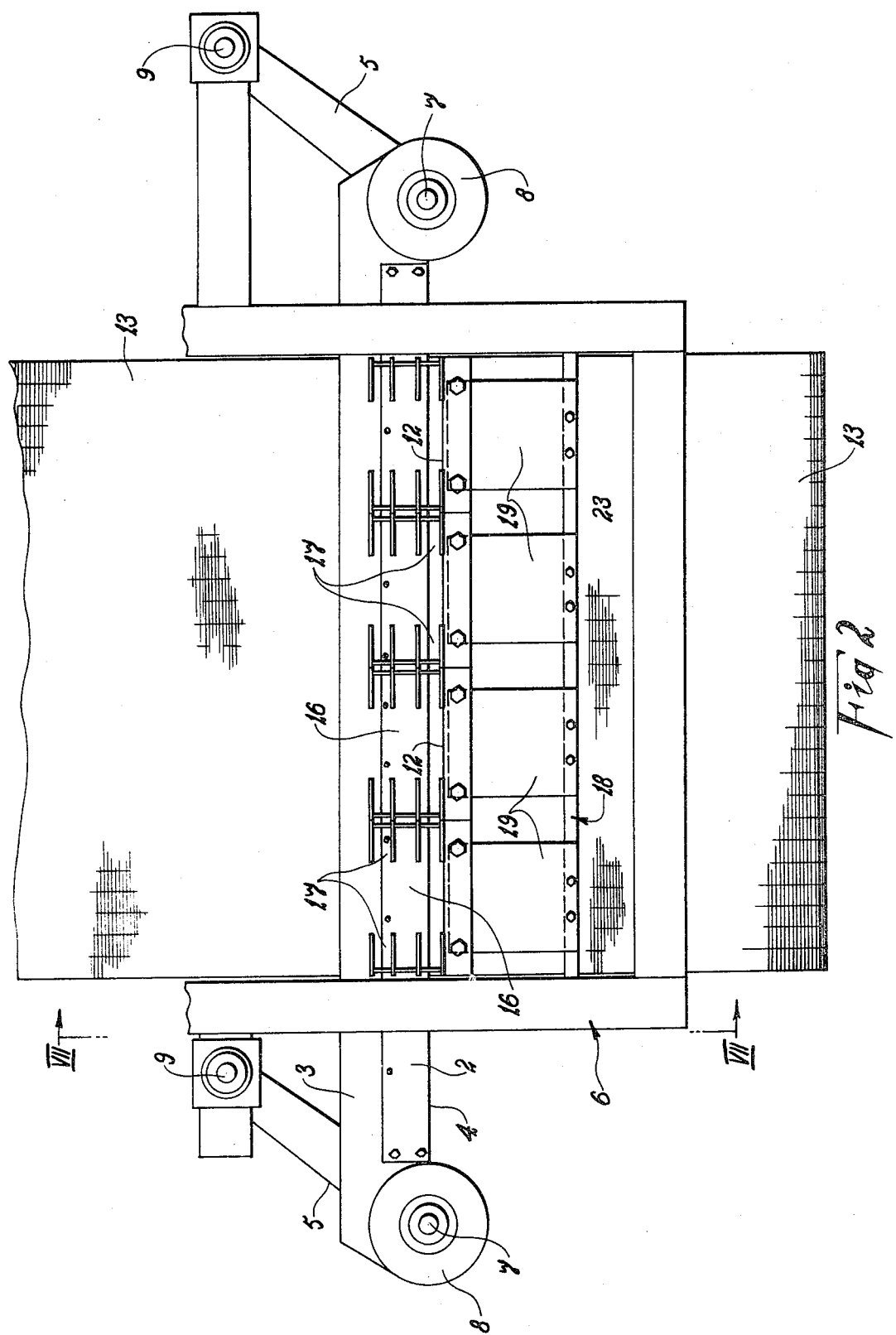
FIG. 2 is a plan view of the apparatus shown in FIG. 1.

In one embodiment, a plurality of upstanding chutes 16 are secured to the machine frame 6 so as to be situated above the conveyor 13, and are located side by side to extend as a group transversely across the conveyor 13. If desired, and as shown in the drawings, more than one group of chutes 16 may be provided, depending upon the cross-sectional size of each chute 16 and the length of stroke of the cutter blade 2 in the general direction of the conveyor 13. Each chute 16 is adapted to feed a pre-cut body 15 of material downwardly into a position for cutting by the cutter blade 2, and the rest or cutting position of each body 15 is determined by an appropriate gauge as hereinafter described. Also, each chute 16 may include a pair of opposed channel members 17 as shown in FIG. 2.

Figure 7:
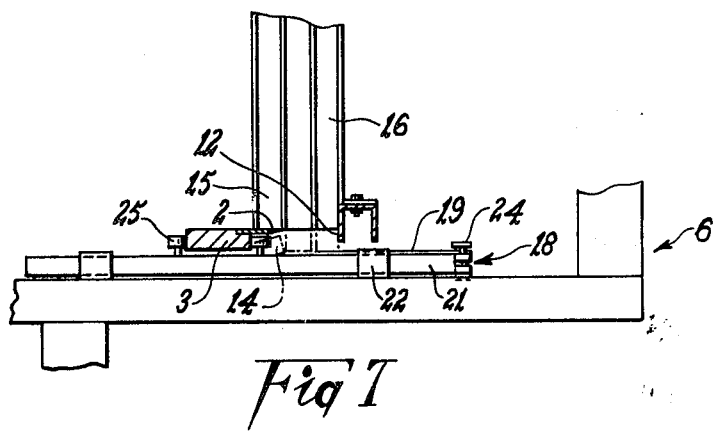
FIG. 7 is a cross-sectional view taken along line V11—V11 of FIG. 2.

The lower end of each chute 16 may be disposed so that the cutter blade 2 passes underneath with minimum clearance as shown in FIG. 7. A separate backing plate may depend downwardly from the remote side of each chute 16 in the group located furthest from the cutter blade 2, but the same plate 12 may serve all chutes of that group. Furthermore, in the case of a plurality of groups of chutes being used, the backing plate 12 is only necessary on that group located remote from the cutter blade 2 when in its retracted position, as the sections of material projecting from the chutes 16 of the other groups may each form a backing for the adjacent material section located nearest the cutter blade 2.

Any suitable gauge may be used, but it preferably includes a frame 18 movably mounted on the machine frame 6 and carrying a plurality of gauge plates 19. Each gauge plate 19 is locatable beneath a respective chute 16, or a number of the chutes 16, to form a support surface against which a lower end of the or each body 15 of material rests. For example, each gauge plate 19 may serve the corresponding chute 16 of each group of chutes, if more than one group is provided. Alternatively, a single gauge plate may serve all chutes.

Preferably, the gauge frame 18 is mounted on the machine frame 6 for movement generally in the longitudinal direction of the conveyor 13. Such mounting may include a pair of laterally spaced arms 21 of the gauge frame 18, each of which extends longitudinally of the conveyor 13 and is located adjacent opposite sides respectively of the conveyor 13. Each arm 21 may be slidably mounted in one or more, preferably two, bearing blocks 22 fixed to the machine frame 6 as shown in FIGS. 2 and 7.

The arms 21 may be connected by a cross member 23 at or adjacent their respective ends remote from the cutter blade 2, and the guide plates 19 may be mounted on that cross member 23 for independent or simultaneous adjustment to vary their spacing from the lower end of the chutes 16. Any suitable adjusting means such as one or more jack-screws 24 may be employed.

Coupling means connecting the cutter blade 2 and guide frame 18 preferably includes a pair of abutment members secured to each arm 21 and spaced apart in the longitudinal direction of the respective arm 21. The carrier bar 3 locates neatly between each pair of abutment members so that the frame is caused to reciprocate in a direction transverse to the cutting edge 4, during movement of the cutter 2 between its extended and retracted positions. Preferably, each abutment is in the form of a roller 25 (see FIG. 7) mounted for rotation about a substantially vertical axes, thereby facilitating movement of the carrier bar 3 laterally relative to the arms 21.

With the foregoing coupling means, a substantially constant distance may be maintained between the cutting edge 4 of the blade 2 and the adjacent end of each gauge plate 19. The cutter and gauge relationship may be such that the gauge plates 19 are located beneath the chutes 16 as the cutter blade 2 moves from its retracted position towards its extended position. As the cutter blade 2 approaches its extended position, the plates 19 move clear of the chutes 16 so allowing material sections 14 severed by the blade 2 to drop to the conveyor 13 as shown in FIG. 7. The coupling means is such that the plates 19 commence to move into position underneath the chutes 16 almost immediately the cutter starts its return movement towards the retracted position. During the first part of that return movement, the material bodies 15 in the chutes 16 are supported on the upper surface of the cutter blade 2 and carrier bar 3 but as the cutter moves clear of the chutes 16 the bodies 15 drop under gravity on to the gauge plates 19 which are by this time located beneath their respective chutes 16. Thus, the cutter blade 2 may continuously move between the retracted and extended positions at a relatively high speed so long as material to be cut is located within the chutes 16.

It will be appreciated from the foregoing description that the present invention provides an extremely simple and effective cutting or slicing apparatus. In particular, the apparatus described has an especially effective cutting action thereby minimizing material waste, and the coupling between the cutter and gauge is such that high speed accurate operation is possible.

Having now described my invention, what I claim as new and desire to secure by Letters Patent is:

1. Cutting or slicing apparatus including, a main frame; a cutter blade movably mounted on said frame and operatively connected to drive means so as to be oscillatable along an arcuate path of travel; gauge means mounted on said frame for movement along a straight path extending transverse to said arcuate path of travel of said cutter blade; said gauge means being located relative to the plane containing the cutting edge of said blade during movement thereof so as to correctly locate material to be cut in the path of said blade, and being located in advance of said cutting edge to allow material cut by said blade to pass between said gauge means and said cutter blade; coupling means connecting said gauge means to said cutter blade so as to cause reciprocatory movement of said gauge means in response to oscillatory movement of said cutter blade; said coupling means permitting relative movement between said cutter blade and said gauge means to compensate for their different paths of travel, and acting between said cutter blade and said gauge means to maintain a predetermined spacing between said cutting edge and the adjacent side or edge of said gauge means; and adjusting means connected to said gauge means to permit variation of the spacing between a gauge surface of the gauge means and said plane containing said cutting edge.

2. Apparatus according to claim 1, wherein said cutter blade is mounted on said frame by a pair of control arms extending substantially parallel to each other and each having one end portion pivotally connected to a respective end portion of the cutter blade, the opposite end portion of each said arm being pivotally connected to said main frame and at least one of said control arms is operatively connected to said main frame and at least one of said control arms is operatively connected to drive means so as to cause oscillatory movement of both control arms about their respective frame pivots and thereby move the cutter blade through an arcuate path of travel.

3. Apparatus according to claim 1, wherein a conveyor is carried by said main frame and located beneath the cutter blade so as to receive material cut thereby and transport it to a delivery point, and a supply of said material is adapted to be fed to the cutter blade through a chute secured to the frame and arranged to retain the material against substantial movement relative thereto during the cutting operation, said material supply being urged towards the gauge means so as to be automatically relocated for each cutting operation.

4. Apparatus according to claim 3, wherein a plurality of said chutes are arranged side by side so as to each feed a respective material supply to the cutter blade.

5. Apparatus according to claim 1, wherein said cutter blade is located at retracted and extended positions respectively at the opposite ends of said path of travel, and in said extended position the cutting edge of the blade extends substantially tangential to the arc defining said path of travel.

6. Apparatus according to claim 1, wherein said plane is located substantially horizontal and contains the upper surface of the cutter blade, and said gauge surface is disposed beneath and substantially parallel to said plane.

7. Apparatus according to claim 1, wherein said gauge surface is defined by the upper surface of a gauge plate secured to a cross member extending substantially parallel to said cutting edge and having its opposite end portions each secured to a respective mounting arm, said arms extending transverse to said cutting edge in the direction of reciprocation of said gauge means and being slidably mounted on said frame for movement in said direction.

8. Apparatus according to claim 1, wherein said adjusting means adjustably connects each end portion of the cross member to its respective mounting arm.

9. Cutting or slicing apparatus including, a main frame; a cutter blade movably mounted on said frame and operatively connected to drive means so as to be oscillatable along an arcuate path of travel; gauge means mounted on said frame for movement along a straight path extending transverse to said arcuate path of travel of said cutler blade; said gauge means being located relative to the plane containing the cutting edge of said blade during movement thereof so as to correctly locate material to be cut in the path of said blade, and being located in advance of said cutting edge to allow material cut by said blade to pass between said gauge means and said cutter blade; coupling means connecting said gauge means to said cutter blade so as to cause reciprocatory movement of said gauge means in response to oscillatory movement of said cutter blade; said coupling means permitting relative movement between said cutter blade and said gauge means to compensate for their different paths of travel, and acting between said cutter blade and said gauge means to maintain a predetermined spacing between said cutting edge and the adjacent side or edge of said gauge means; and adjusting means connected to said gauge means to permit variation of the spacing between a gauge surface of the gauge means and said plane containing said cutting edge, said gauge surface being defined by the upper surface of a gauge plate secured to a cross member extending substantially parallel to said cutting edge and having its opposite end portions each secured to a respective mounting arm, said arms extending transverse to said cutting edge in the direction of reciprocation of said gauge means and being slidably mounted on said frame for movement in said direction, said gauge means being coupled to the cutter blade by two pair of abutment members, each said pair being secured to a respective said mounting arm so that the members thereof are spaced apart in the longitudinal direction of the arm and each slidably engages a respective opposite abutment face of said cutter blade, and each said abutment face projects downwardly towards said arms and extends substantially parallel to said cutting edge.

10. Cutting or slicing apparatus including, a main frame; a cutter blade movably mounted on said frame and operatively connected to drive means so as to be oscillatable along an arcuate path of travel; gauge means mounted on said frame for movement along a straight path extending transverse to said arcuate path of travel of said cutter blade; said gauge means being located relative to the plane containing the cutting edge of said blade during movement thereof so as to correctly locate material to be cut in the path of said blade, and being located in advance of said cutting edge to allow material cut by said blade to pass between said gauge means and said cutter blade; coupling means connecting said gauge means to said cutter blade so as to cause reciprocatory movement of said gauge means in response to oscillatory movement of said cutter blade; said coupling means permitting relative movement between said cutter blade and said gauge means to compensate for their different paths of travel, and acting between said cutter blade and said gauge means to maintain a predetermined spacing between said cutting edge and the adjacent side or edge of said gauge means; and adjusting means connected to said gauge means to permit variation of the spacing between a gauge surface of the gauge means and said plane containing said cutting edge, said cutter blade including a carrier bar and a blade element releasably secured thereto, said abutment faces are defined by front and rear faces respectively of said carrier bar, and each said abutment is in the form of a roller arranged to facilitate lateral movement of the carrier bar relative to said mounting arms.

11. Cutting or slicing apparatus including a main frame; a cutter blade movably mounted on said frame and operatively connected to drive means so as to be oscillatable along an arcuate path of travel; gauge means mounted on said frame for movement along a straight path extending transverse to said arcuate path of travel of said cutter blade; said gauge means being located relative to the plane containing the cutting edge of said blade during movement thereof so as to correctly locate material to be cut in the path of said blade, and being located in advance of said cutting edge to allow material cut by said blade to pass between said gauge means and said cutter blade; coupling means connecting said gauge means to said cutter blade and comprising first and second abutment means attached to said gauge means and said cutter blade respectively, said first and second abutment means cooperating to prevent relative movement between said gauge means and said cutter blade in the direction of said straight path but permitting such relative movement transverse to said direction, whereby said gauge means is caused to reciprocate in response to oscillatory movement of said cutter blade and a predetermined spacing is maintained between said cutting edge and the adjacent side or edge of said gauge means; and adjusting means connected to said gauge means to permit variation of the spacing between a gauge surface of the gauge means and said plane containing said cutting edge.

* * * * *